(12) United States Patent
Gaonkar et al.

(10) Patent No.: US 11,347,694 B2
(45) Date of Patent: May 31, 2022

(54) EFFICIENT CHANGE BLOCK TRACKING IN A DISTRIBUTED GENERATION-ID (GID) BASED LOG STRUCTURED FILE SYSTEM (LSFS)

(71) Applicant: Cisco Technology, Inc., San Jose, CA (US)

(72) Inventors: Shravan Gaonkar, Gainesville, FL (US); Smit Shah, Saratoga, CA (US); Sandip Agarwala, Cupertino, CA (US); Arif Yakub Patel, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 488 days.

(21) Appl. No.: 16/522,976

(22) Filed: Jul. 26, 2019

(65) Prior Publication Data

US 2021/0026810 A1    Jan. 28, 2021

(51) Int. Cl.
*G06F 11/14*      (2006.01)
*G06F 16/178*     (2019.01)
(Continued)

(52) U.S. Cl.
CPC ........ *G06F 16/178* (2019.01); *G06F 11/1451* (2013.01); *G06F 11/1469* (2013.01); *G06F 11/2094* (2013.01); *G06F 16/1805* (2019.01); *G06F 16/2246* (2019.01); *G06F 16/2358* (2019.01); *G06F 16/2365* (2019.01); *G06F 2201/80* (2013.01); *G06F 2201/82* (2013.01)

(58) Field of Classification Search
CPC ............. G06F 11/1451; G06F 11/1446; G06F 11/1469; G06F 16/178; G06F 16/2246; G06F 16/1805; G06F 2201/84; G06F 2201/80; G06F 2201/82
See application file for complete search history.

(56) References Cited

U.S. PATENT DOCUMENTS 7,873,601 B1 * 1/2011 Kushwah ............ G06F 11/1451
                                                707/654
9,110,910 B1 * 8/2015 Li ........................ G06F 11/1448
(Continued)

OTHER PUBLICATIONS

"Changed Block Tracking (CBT) on Virtual Machines (1020128)", online: https://kb.vmware.com/s/article/1020128, Apr. 2010, 3 pages, KB VMware Knowledge Base.

*Primary Examiner* — Yolanda L Wilson
(74) *Attorney, Agent, or Firm* — Behmke Innovation Group LLC; Kenneth J. Heywood; Jonathon P. Western (57) ABSTRACT

In one embodiment, a device performs a plurality of iterations of write operations on portions of a file tree of a file system to a first storage cluster, each write operation flagging the written portion of the file tree with a generation identifier indicative of the associated iteration of the write operations. The device identifies a set of the written portions of the file tree as unsynchronized between the first storage cluster and a second storage cluster by performing a search for changes made to the written portions of the file tree between a generation identifier associated with the first storage cluster and a generation identifier associated with the second storage cluster. The device synchronizes the first and second storage clusters by sending, via a network, the unsynchronized portions of the file tree from the first storage cluster to the second storage cluster.

20 Claims, 9 Drawing Sheets

(51) Int. Cl.
  *G06F 16/23*   (2019.01)
  *G06F 16/18*   (2019.01)
  *G06F 16/22*   (2019.01)
  *G06F 11/20*   (2006.01)

(56) References Cited

U.S. PATENT DOCUMENTS

| | | | |
|---|---|---|---|
| 9,124,612 B2 | 9/2015 | Vasan et al. | |
| 9,430,331 B1* | 8/2016 | Basov | G06F 16/178 |
| 9,984,129 B2 | 5/2018 | Patel et al. | |
| 10,261,865 B1* | 4/2019 | Bajaj | G06F 11/1469 |
| 10,324,804 B1* | 6/2019 | Patwardhan | G06F 16/2358 |
| 10,678,652 B1* | 6/2020 | Rangapuram | G06F 11/1451 |
| 10,754,731 B1* | 8/2020 | Arumugam | G06F 16/128 |
| 2004/0267836 A1* | 12/2004 | Armangau | G06F 11/1435 |
| 2008/0294704 A1* | 11/2008 | Akagawa | G06F 11/1469 |
| 2011/0296133 A1* | 12/2011 | Flynn | G06F 3/0619 |
| | | | 711/171 |
| 2017/0003895 A1* | 1/2017 | Hatfield | G06F 11/2058 |
| 2021/0117085 A1* | 4/2021 | Vankamamidi | G06F 3/0679 |

\* cited by examiner

EFFICIENT CHANGE BLOCK TRACKING IN A DISTRIBUTED GENERATION-ID (GID) BASED LOG STRUCTURED FILE SYSTEM (LSFS)

TECHNICAL FIELD

The present disclosure relates generally to computer networks, and, more particularly, to efficient change block tracking in a distributed generation-id (GID) based log structured file system (LSFS).

BACKGROUND

Change Block Tracking (CBT) is one of the approaches to replicate or restore data from one storage system (e.g., a cluster) to another. The main use-cases for CBT are for disaster recovery, asynchronous replication, backup, and the like. In each of these use-cases, the source storage system or cluster takes point-in-time snapshots of the file system. These snapshots are most often based on an amount of time elapsed or an amount of data written. For example, snap(i) may be the snapshot taken of the file system at a time $t_i$.

In many implementations, the approach taken to synchronize data between two storage systems is to transmit the snapshot to be replicated to the other storage system. For example, assume that snap(i+1) is to be replicated from a first storage system to a second storage system, which currently stores snap(i). In such a case, the first storage system may send snap(i+1) to the second storage system via a network. In turn, the second storage system may compare snap(i+1) and its previously stored snapshot, snap(i), to remove any redundancies. Unfortunately, this approach imposes a large overhead on the network itself, as much of the transmitted data is not actually needed for the replication.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device performs a plurality of iterations of write operations on portions of a file tree of a file system to a first storage cluster, each write operation flagging the written portion of the file tree with a generation identifier indicative of the associated iteration of the write operations. The device identifies a set of the written portions of the file tree as unsynchronized between the first storage cluster and a second storage cluster by performing a search for changes made to the written portions of the file tree between a generation identifier associated with the first storage cluster and a generation identifier associated with the second storage cluster. The device synchronizes the first and second storage clusters by sending, via a network, the unsynchronized portions of the file tree from the first storage cluster to the second storage cluster.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1:
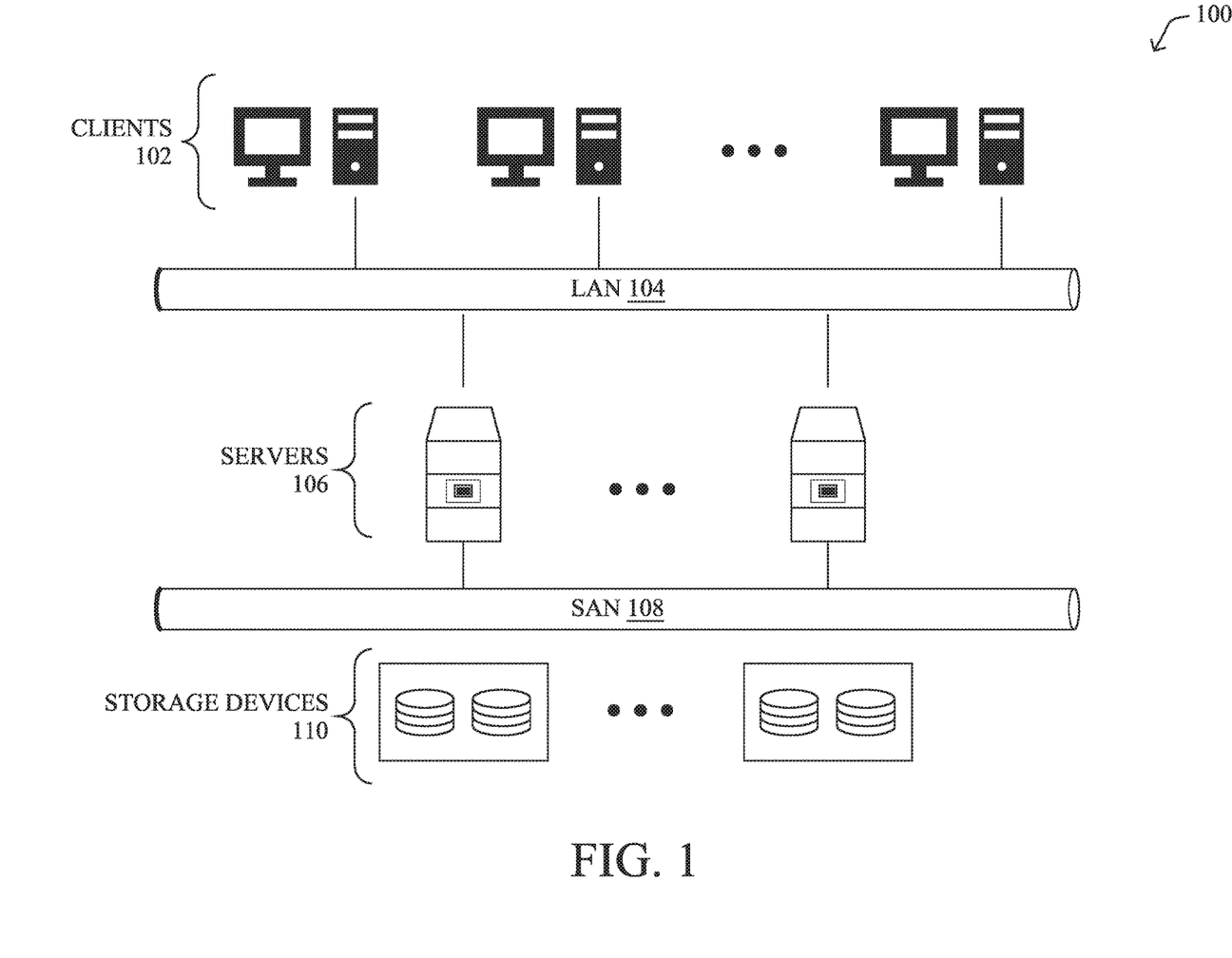
FIG. 1 illustrates an example computer network.

FIG. 1 is a schematic block diagram of an example computer network 100 illustratively comprising any number of clients 102 that are interconnected by a LAN 104. In general, clients 102 may comprise any number of computing devices such as, but not limited to, personal computers, mobile devices (e.g., cellular phones, tablets, etc.), wearable devices, sensors, actuators, or the like. Also connected to LAN 104 may be any number of servers 106 that provide various applications to clients 102 via LAN 104. For example, a client 102 may communicate with a server 106 via LAN 104 to execute a document management system (DMS) application, a messaging application, a videoconferencing application, a customer relationship management (CRM) application, etc.

As shown, network 100 may also include a storage area network (SAN) 108 that connects servers 106 with any number of storage devices 110. For example, storage devices 110 may include disk arrays, tape libraries, or other forms of persistent storage. As would be appreciated, a SAN, such as SAN 108, is a specialized form of network that allows for block-level data storage in storage devices 110 in a manner that allows storage devices 110 to effectively act as local storage for the operating systems of servers 106. Typically, a SAN forms a switched fabric between servers 106 and storage devices 110. In further embodiments, SAN 108 may alternatively take the form of a PCI-Express (PCIe) network, a LAN, or any other suitable form of network.

Figure 2:
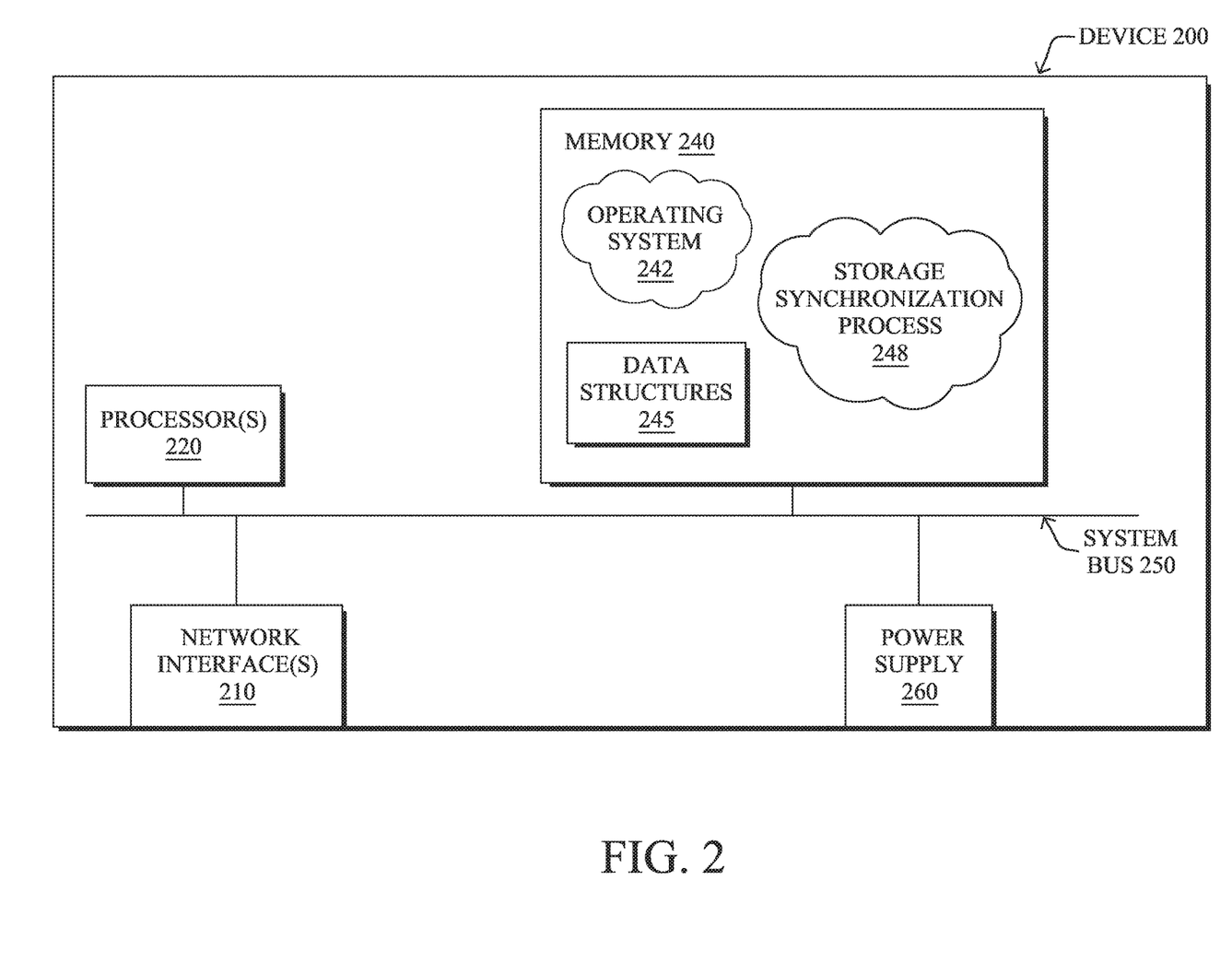
FIG. 2 illustrates an example network device/node.

FIG. 2 is a schematic block diagram of an example node/device 200 that may be used with one or more embodiments described herein, e.g., as any of clients 102, servers 106, or storage devices 110 shown in FIG. 1, a device in communication therewith, or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., Linux, another operating system, etc.), portions of which are typically resident in memory 240 and executed by the processor(s), functionally organizes the node by, inter alia, invoking network operations in support of software processors and/or services executing on the device. These software processors and/or services may comprise storage synchronization process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Figure 3:
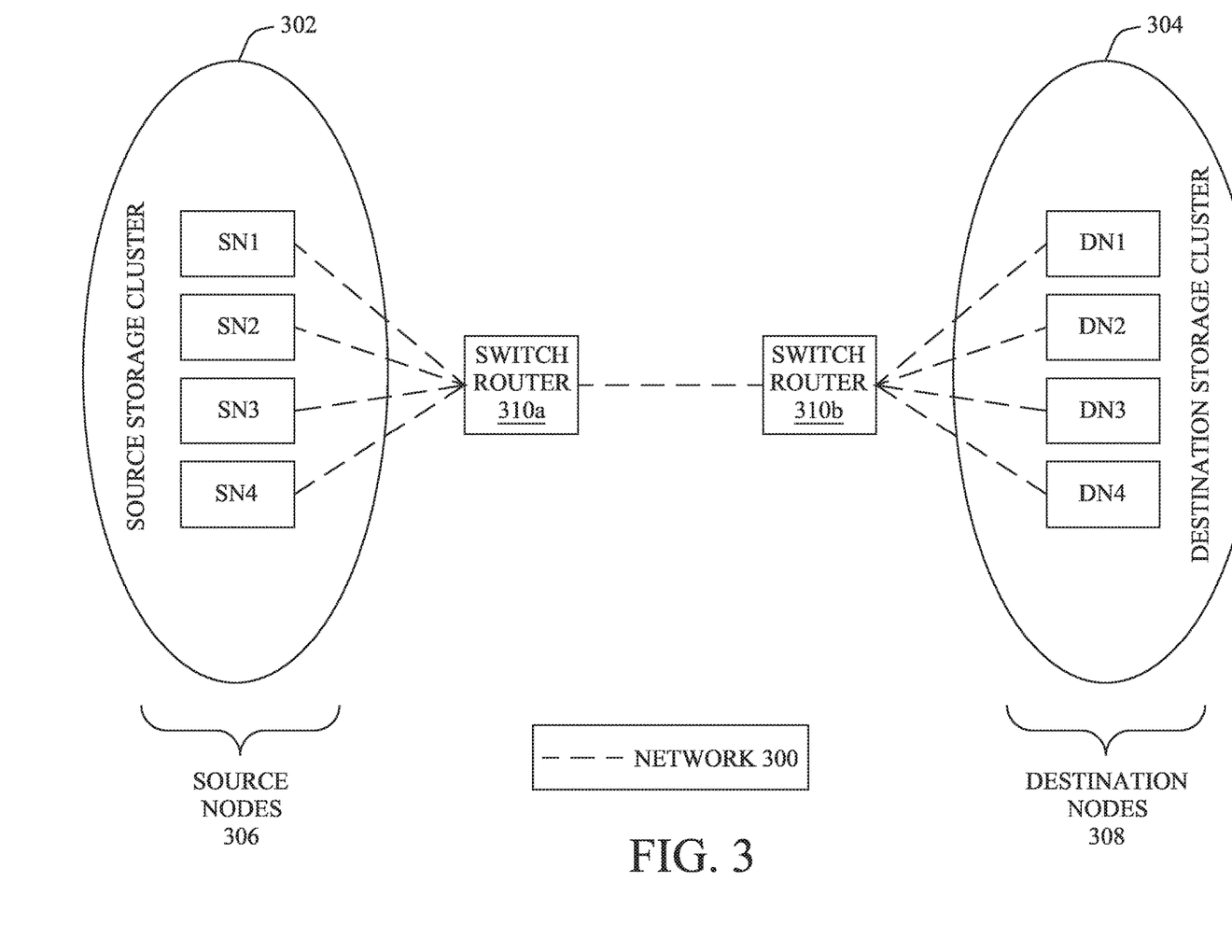
FIG. 3 illustrates an example network comprising storage/data clusters.

FIG. 3 illustrates an example of a network 300 comprising a first, source storage/data cluster 302 and a second, destination storage/data cluster 304, according to various embodiments. As shown, network 300 may take the form of a SAN (e.g., SAN 100) or other suitable network that provides connectivity between cluster 302 and 304. For example, as would be appreciated, network 300 may comprise any number of networking devices 310 (e.g., 310a and 310b), such as switches, routers, or the like. For example, networking devices 310 may comprise 6200 Series Fabric Interconnects from Cisco Systems, Inc.

Cluster 302 may comprise any number of source nodes 306 (e.g., source nodes SN1-SN4) and cluster 304 may comprise any number of destination nodes 308 (e.g., destination nodes DN1-DN4). In some cases, network 300 may implement the HyperFlex architecture from Cisco Systems, Inc., or another suitable architecture for interconnecting the networking, computing, and storage functions of a data center. In such architectures, each node 306-308 may include its own data platform controller that implements a distributed file system using internal solid state device (SSD) drives and/or high-capacity hard disk drive (HDD) drives to store data. These controllers of the nodes in a given cluster may be interconnected using, for example, 10 Gb Ethernet to form a single pool of storage that spans the nodes of the cluster. Application programming interface (API) plug-ins are leveraged to provide data access to files, blocks, and/or objects via the data layer. In addition, source and destination files can be sharded and distributed across multiples nodes in a given cluster.

As noted above, Change Block Tracking (CBT) represents one approach to replicate or restore data from one storage system/cluster to another. This is typically done for purposes of disaster recovery, asynchronous replication, backup, and the like. In each of these cases, the storage system/cluster takes a point-in-time snapshot of the file system. These snapshots are most often based on an amount of elapsed time or an amount of data written. For sake of illustration, let snap(0) represent the snapshot taken at time $t_0$, snap(1) represent the snapshot taken at time $t_1$, snap(i) represent the snapshot taken at time $t_i$, etc.

To replicate data between storage clusters, such as from source storage cluster 302 to destination storage cluster 304, cluster 302 may take a snapshot of its FileSystem or FileTree and transmit the snapshot to destination cluster 304. As would be appreciated, the most naïve approach to perform the replication would be for cluster 302 to send its entire snapshot to cluster 304 and cluster 304 eliminate any redundant portions. However, this approach also means quite a bit of overhead on network 100. A basic optimization would, thus, be to track the list of data blocks that were changed between each snapshot.

Efficient Change Block Tracking in a Distributed
Generation-ID (GID) Based Log Structured File
System LSFS The techniques herein introduce a mechanism for tracking the list of changed blocks or other portions of a file tree between each snapshot through the use of generation-IDs (GIDs). In some embodiments, each iteration of write operations for a file tree may have a corresponding GID used to flag the written portions of the file tree. By integrating this flagging mechanism into the file system itself, a tree is essentially created that keeps track of the birth of a block or object, allowing for changes to be quickly identified and replicated across storage clusters.

Specifically, according to one or more embodiments of the disclosure as described in detail below, a device performs a plurality of iterations of write operations on portions of a file tree of a file system to a first storage cluster, each write operation flagging the written portion of the file tree with a generation identifier indicative of the associated iteration of the write operations. The device identifies a set of the written portions of the file tree as unsynchronized between the first storage cluster and a second storage cluster by performing a search for changes made to the written portions of the file tree between a generation identifier associated with the first storage cluster and a generation identifier associated with the second storage cluster. The device synchronizes the first and second storage clusters by sending, via a network, the unsynchronized portions of the file tree from the first storage cluster to the second storage cluster.

Illustratively, the techniques described herein may be performed by hardware, software, and/or firmware, such as in accordance with the storage synchronization process 248, which may include computer executable instructions executed by the processor 220 (or independent processor of interfaces 210) to perform functions relating to the techniques described herein.

Figure 4:
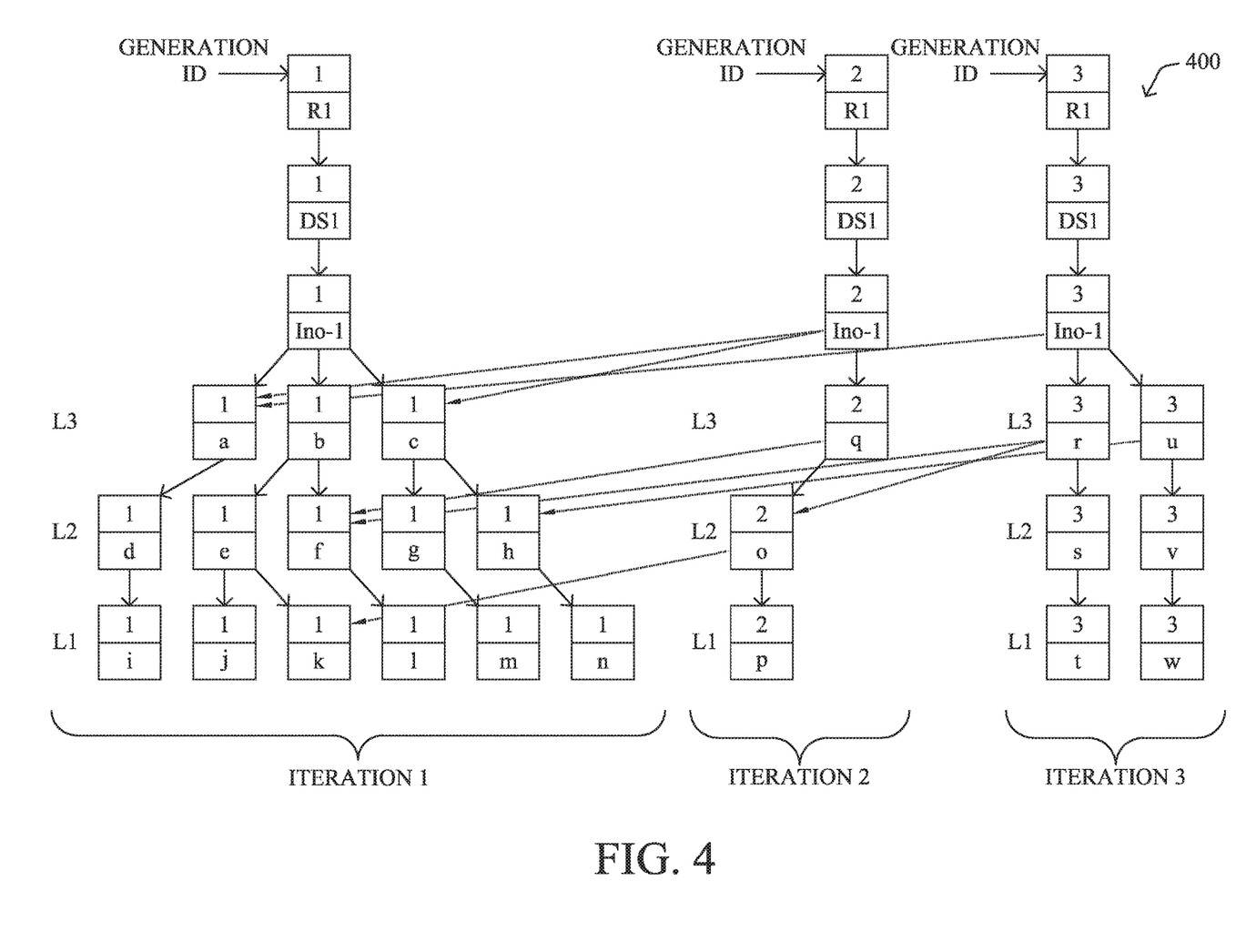
FIG. 4 illustrates an example of write operations using generation-id flagging.

Operationally, FIG. 4 illustrates an example 400 of the generation-ID (GID) flagging mechanism introduced herein, according to various embodiments. As would be appreciated, the techniques herein can also be run in parallel across multiple nodes of a cluster, for better scaling and performance.

As would be appreciated by one skilled in the art, a superblock is a record of the characteristics of a file tree of a filesystem. For example, a superblock may indicate its overall size, block size of its constituent blocks, counts of its empty and filled blocks, the size and locations of its associated inodes, block group size information, disk block map, usage information, and the like. In general, a filesystem refers to a hierarchy of directories that are used to organize files, with the hierarchy also sometimes referred to as a directory tree. Such a tree on Linux and other Unix-based systems, for example, typically begins at a root directory from which all other directories stem. To further help organize the files, inodes may be associated with each file that retains information/metadata about that file.

The techniques herein are compatible with both block storage and object storage approaches. Generally speaking, block storage splits the files of the filesystem into evenly sized blocks of data. However, no additional context is stored regarding the block. In contrast, object storage attempts to group the data itself with metadata and a unique identifier.

According to various embodiments, as shown, every block/object that is written to memory, either persistent storage or short term memory, may be flagged with the current generation-ID (GID). For example, assume that the file undergoing the write operations has three levels, with level L1 representing the data block. During the first iteration of write operations, iteration 1, the written blocks or other portions of the file tree may each be flagged with the current GID, GID=1. In other words, all of the written portions of the file tree written during this iteration will be flagged with GID=1.

Similarly, on the second iteration of writes, iteration 2, the GID will be changed to GID=2 and any portion of the file tree written during this iteration of write operations will be flagged with this GID. This process will continue during iteration 3 during which the GID is updated to GID=3 and the written blocks/objects flagged, accordingly.

As a result of the GID flagging process shown, a tree is essentially formed that keeps track of the birth of a portion of a file tree, such as a block or object. According to various embodiments, the GID information can then be leveraged to find the changes between any two GIDs. For example, pseudocode to determine the change block tracking (CBT) list between two generations is as follows:

GetCBT(GID_high, GID_low, node, CBT-list)
If GID_low≤node→genid≤GID_high then
If tree-root has no children return
For each cv in children_of_(node)
if GID_low≤cv→GID≤GID_high call Then
GetCBT(GID_high, GID_low, cv, CBT-list)
CBT-list.append(node)

Using the above algorithm, all of the changes (i.e., CBT-list) made for a given node between two GIDs, GID_low and GID_high simply by walking the tree of the file system. By filtering the resulting change block tracking list, CBT-list, the changed blocks or other portions of interest can easily be identified. For example, the system could identify all of the changed data blocks between two generations by filtering for L1 tagged objects in the CB list.

Figure 5:
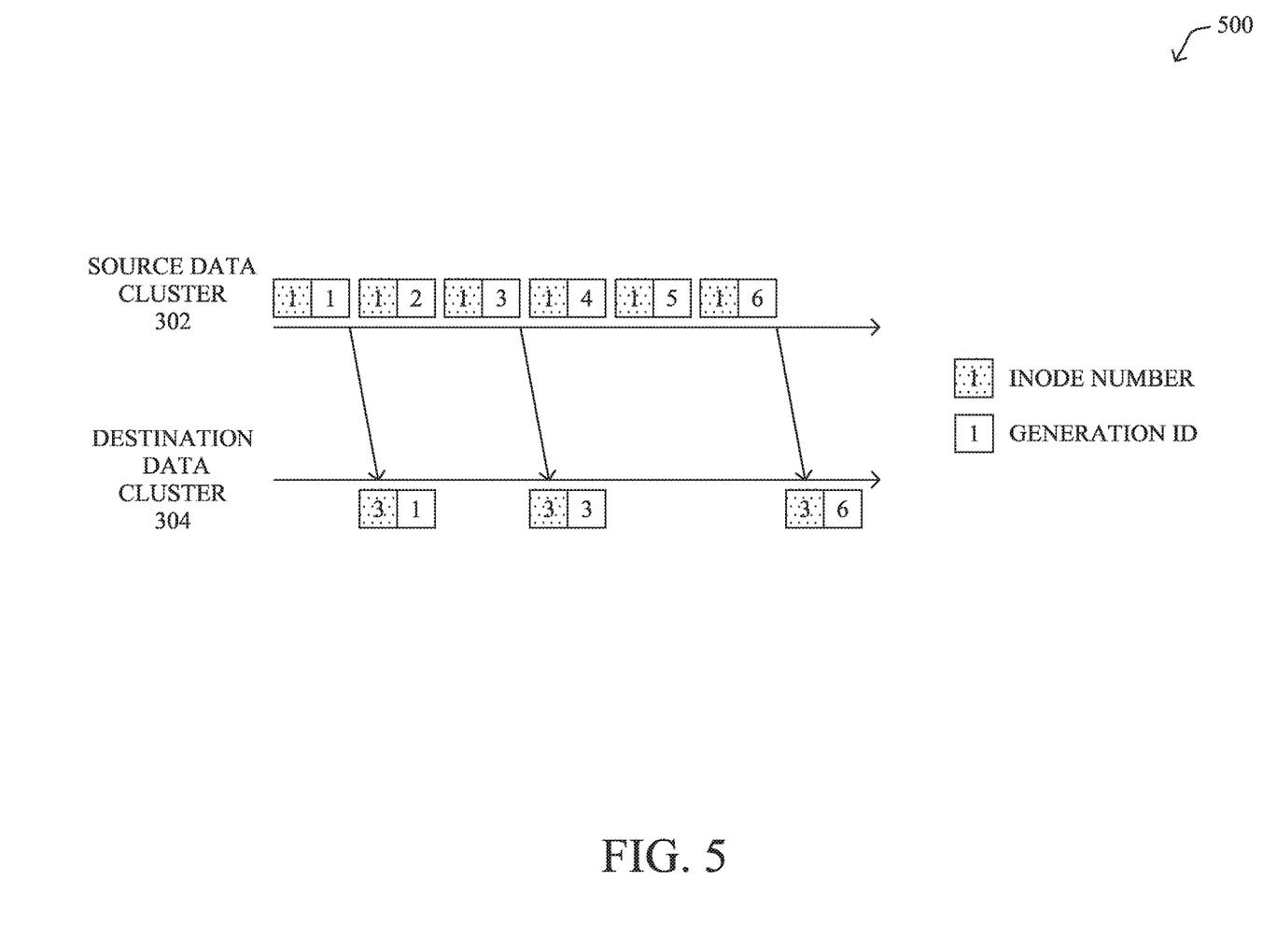
FIG. 5 illustrates an example of replicating data from a source cluster to a destination cluster.

FIG. 5 illustrates an example 500 of replicating data from source data cluster 302 to destination cluster 304, described previously, in various embodiments. As shown, assume that inode 1 on cluster 302 is cloned/replicated to inode 3 on cluster 304 via the network at a desired cadence or time. At each call to replicate, a snapshot is taken at destination cluster 304 and the CBT-list blocks are transmitted by cluster 302 to cluster 304 via the network to apply on top of the current snapshot on cluster 304, to replicate the snapshot on cluster 302. Note that CBT(src,gen-id=3, gend-id=1) ==CBT(dst, gen-id=3, gen-id=1).

More specifically, assume that inode 1 on cluster 302 is to be replicated to cluster 304, updating the corresponding inode 3 on cluster 304 from GID=1 to GID=6. In some embodiments, the following pseudocode represents the algorithm to achieve this replication:

Clone inode=3 at destination cluster 304
Call GenCBT(6, 3, inode=1, 6, CBT-list) at cluster 302
Filter CBT-list to get the changed data objects/blocks
Transmit the changed data objects/blocks from cluster 302 to cluster 304
Write the changed data objects/blocks on inode 3 on cluster 304

By flagging the written data objects/blocks with their corresponding GIDs, the CBT-list can be easily identified and used to only transmit those changes to the destination cluster 304 for replication.

Figure 6:
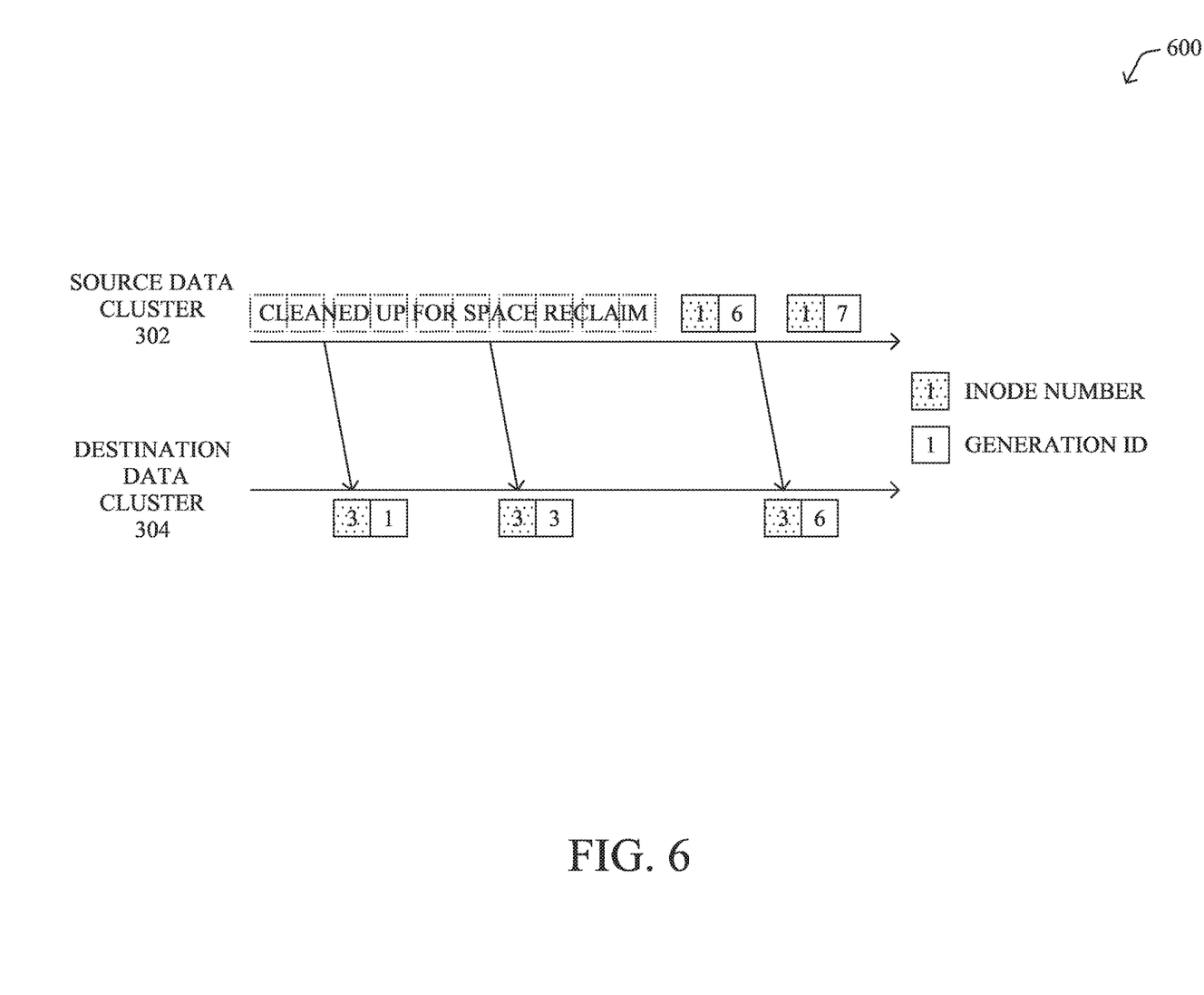
FIG. 6 illustrates an example of restoring data across clusters.

FIG. 6 illustrates an example 600 of reverting/restoring data across clusters, according to various embodiments. As shown, consider again the case of source data cluster 302 and destination data cluster 304 to which the data of cluster 302 is replicated. In some embodiments, the replicated file system may be a log-structured file system (LSFS) in which data and metadata are sequentially written to a log, which functions as a circular buffer. This means that, over time, data will be reclaimed from the tail end of the log, to free up space for newer versions of the blocks/objects written to the log.

Assume that the replication techniques described above are used to replicate inode 1 from cluster 302 to inode 3 on cluster 304 for GIDs 1, 3, and 6, and that the older versions of the written data on cluster 302 prior to GID 6 have been cleaned up for space reclamation. In such a case, a user may wish to revert cluster 302 back to an earlier snapshot, such as GID=3 for inode 1, which is no longer available on cluster 302. In such a case, this snapshot can be restored to cluster 302 from cluster 304 as follows:

Clone inode=1, genid=6 from cluster 302
Call GenCBT(6, 3, inode=3,6, CBT-list) at cluster 304
Filter CBT-list(inode=3,6) to get the data objects/blocks
Generate data object/blocks using the CBT-list(inode=3, 3) using CBT-list(inode=3,6)
Transmit the identified changed data objects/blocks from cluster 304 to cluster 302 via the network
Write the received data objects/blocks to inode 1 on cluster 302

Figure 7:
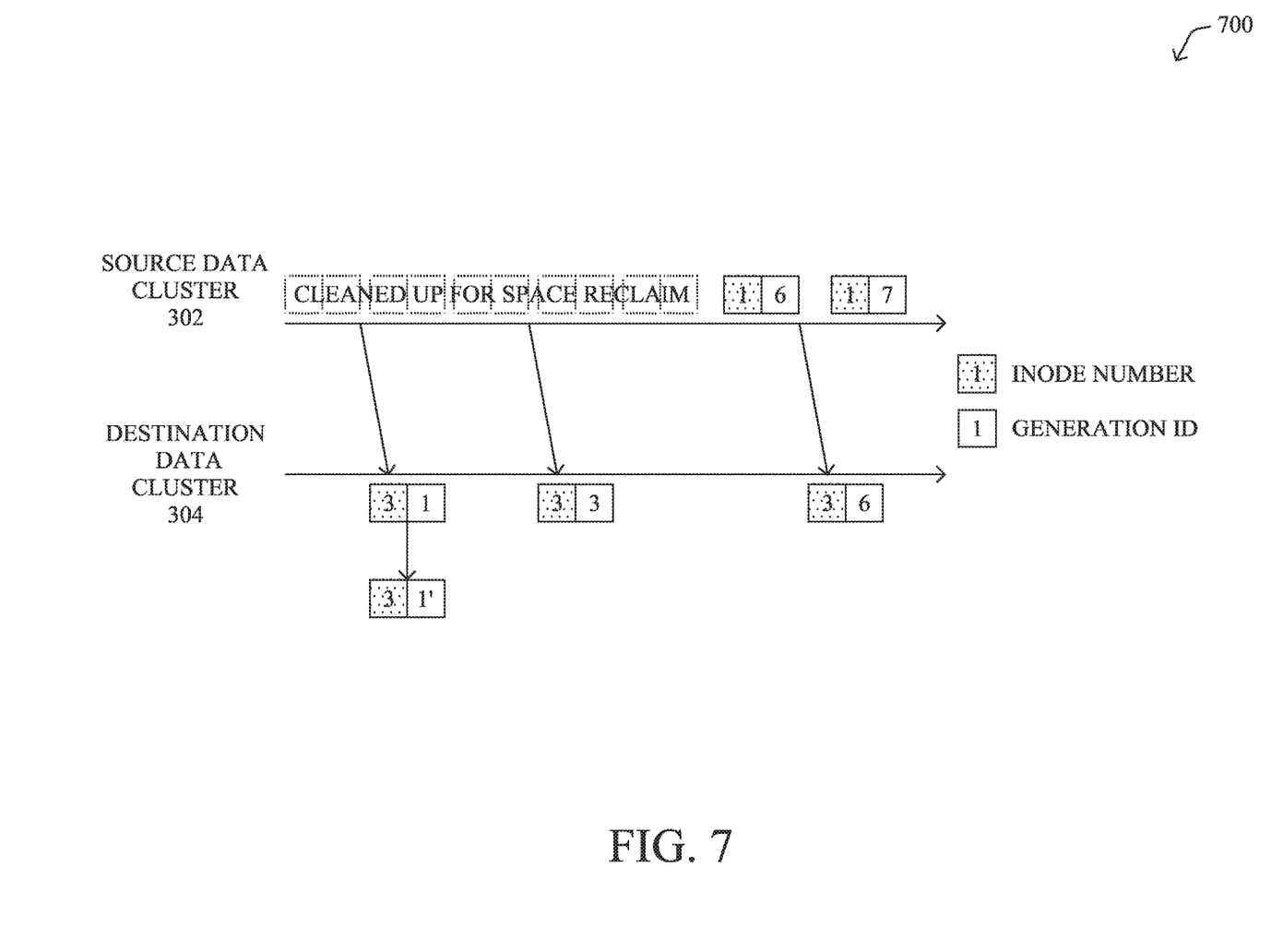
FIG. 7 illustrates an example of a failback between clusters.

FIG. 7 illustrates an example 700 of a failback operation between clusters, according to various embodiments. As shown, again consider the case of clusters 302 and 304. As would be appreciated, failback generally refers to the restoration of a cluster or other system after a failover event.

During a failover event, the primary cluster 302 may experience a failure and its processes shifted over to cluster 304 in the meantime. Once cluster 302 is again available, it can be restored in a similar manner to the restoration process described above, but with a slight variation if the user has reverted to an intermediate snapshot, made forward progress, and the corresponding source snapshot cleaned up on cluster 302 for space reclamation.

More specifically, as shown, assume that the user has reverted to snapshot (inode=3, GID=1) and made forward progress. When the user decides to failback to a snapshot of the current state, which is represented as snapshot (inode=3, GID=1'). In such a case, this can be achieved using the below approach:

Clone inode=1, genid=6 on cluster 302
Call GenCBT(6,2, inode=3,6) on cluster 304
Call GenCBT(1', 1, inode=3,1') on cluster 304
Get combined data object/blocks with CBT in step 3 taking precedence.
Transmit the resulting blocks/objects from cluster 304 to cluster 302
Write the transmitted data onto inode 1 on cluster 302

Figure 8:
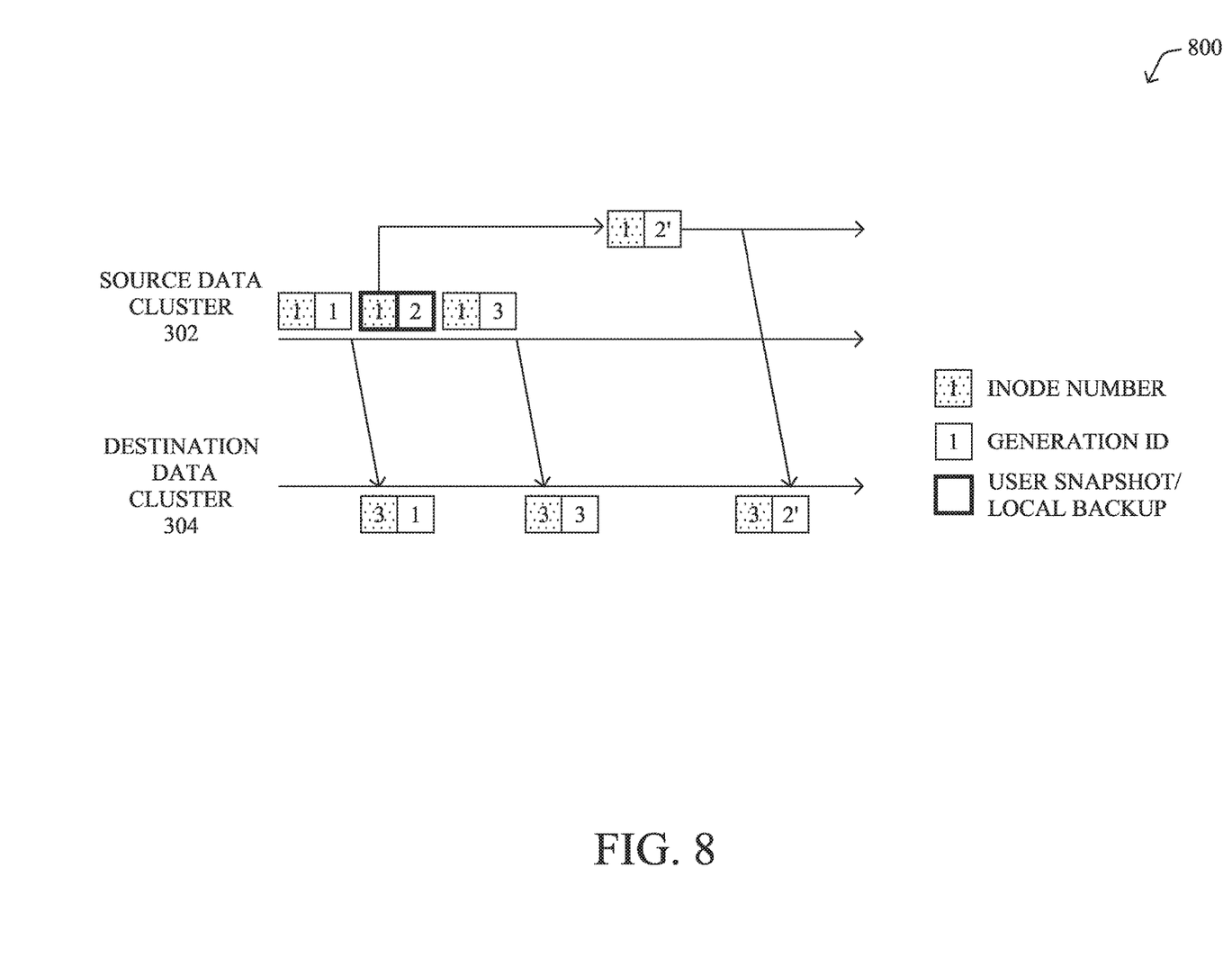
FIG. 8 illustrates an example of replicating data in the case of a local backup.

A further use case of the techniques herein is illustrated in example 800 in FIG. 8, according to various embodiments. As shown, again assume that inode 1 is replicated from cluster 302 to inode 3 on cluster 304, normally. However, assume now that during this process, the user creates a user snapshot/local backup of inode 1 from GID=2. Such a user snapshot/local backup can coexist with those used for the replication to cluster 304. In addition, the user may be able to revert the file system to any of the user snapshots/local backups, which would change the lineage. Today, this typically forces the user to performing a full backup copy. However, if the file system tracks the replication lineage through the use of GIDs, the requested reversion can be detected easily and a variation of the above mechanisms used to replicate the user snapshot/local backup to cluster 304.

More specifically, as shown, let GID=2' represent the user snapshot/local backup taken after GID=2. However, as part of the standard replication process shown, assume that, in the meantime, inode 1 with GID=3 has been already been replicated to inode 3, GID=3 on cluster 304. If the user subsequently reverts to the user snapshot/local backup of inode 1 with GID=2', the following approach can be taken to perform this reversion on cluster 304:

Take a clone of inode 3, GID=3 on destination data cluster 304
Get CBT(3,3, inode(1,3)) at source data cluster 302
Get CBT(2',2, inode(1,2')) at data cluster 302
Get the combined data object/blocks with CBT in the above third step taking precedence
Transmit the identified changed data objects/blocks to cluster 304 from cluster 302 via the network
Write the transmitted data objects/blocks to inode 3 on cluster 304

Thus, by writing GID information directly into the file system with the write operations, it becomes relatively trivial to identify the changed objects/blocks that need to be transmitted to the other cluster.

Figure 9:
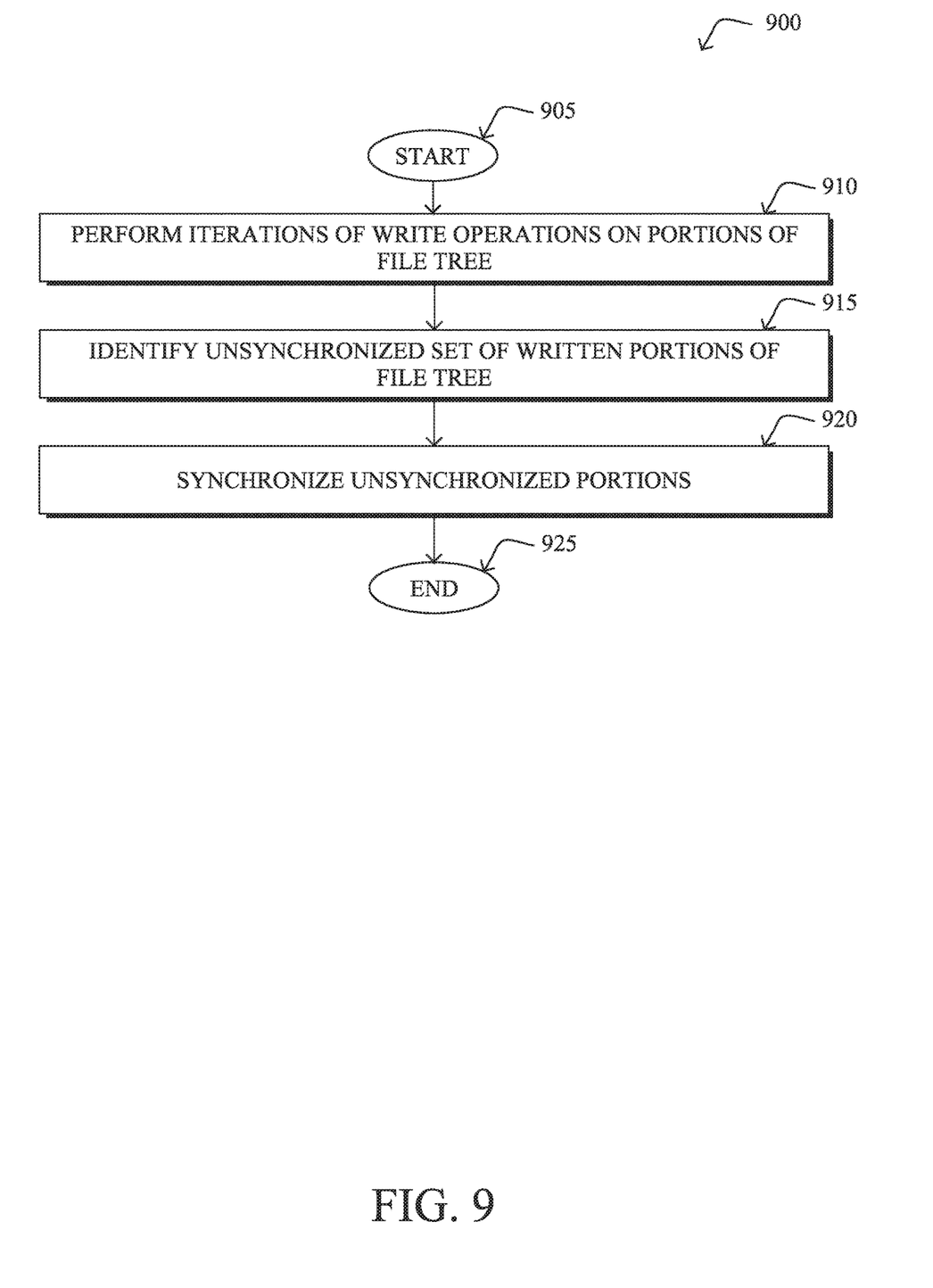
FIG. 9 illustrates an example simplified procedure for performing change block tracking using generation-id flagging.

FIG. 9 illustrates an example simplified procedure 900 for performing change block tracking in a network, in accordance with one or more embodiments described herein. For example, a non-generic, specifically configured device (e.g., device 200) may perform procedure 900 by executing stored instructions (e.g., process 248). The procedure 900 may start at step 905, and continues to step 910, where, as described in greater detail above, the device may perform a plurality of iterations of write operations on portions of a file tree of a file system to a first storage cluster. For example, the device may write blocks or objects of the file system to a first storage cluster and, for each write operation, flag the written portion of the file tree with a generation identifier indicative of the associated iteration of the write operations.

At step 915, as detailed above, the device may identifying a set of the written portions of the file tree as unsynchronized between the first storage cluster and a second storage cluster. To do so, in various embodiments, the device may perform a search for changes made to the written portions of the file tree between a generation identifier associated with the first storage cluster and a generation identifier associated with the second storage cluster. For example, say that the current generation identifier of the first storage cluster is GID=6 and the current generation identifier of the second/destination storage cluster is GID=3. In such a case, the device may walk the tree of the file system to identify those portions of the file tree that were written between these generations.

At step 920, the device may synchronizing the first and second storage clusters, as described in greater detail above. To do so, the device may send, via the network (e.g., a SAN, etc.), the unsynchronized portions of the file tree from the first storage cluster to the second storage cluster. Procedure 900 then ends at step 925.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for efficient change block tracking by integrating generating identifier (GID) tracking directly into the write operations. In doing so, changes to portions of the file tree can be identified quickly by walking the tree and identifying which portions were modified between GIDs. In doing so, only those changed blocks or objects need to be transmitted to the other storage cluster.

While there have been shown and described illustrative embodiments that provide for the efficient change block tracking in a file system, such as an LSFS, it is to be understood that various other adaptations and modifications may be made within the spirit and scope of the embodiments herein. For, while certain network configurations are shown, such as a SAN, other suitable network configurations may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    performing a plurality of iterations of write operations on portions of a file tree of a file system to a first storage cluster, each write operation flagging the written portion of the file tree with a generation identifier indicative of an associated iteration of the write operations;
    identifying a set of the written portions of the file tree as unsynchronized between the first storage cluster and a second storage cluster by performing a search for changes made to the written portions of the file tree between a generation identifier associated with the first storage cluster and a generation identifier associated with the second storage cluster; and
    synchronizing the first and second storage clusters by sending, via a network, the unsynchronized portions of the file tree from the first storage cluster to the second storage cluster.

2. The method as in claim 1, wherein identifying the set of unsynchronized portions of the file tree between the first storage cluster and the second storage cluster comprises:
    searching for changes made to the written portions of the file tree for a particular inode.

3. The method as in claim 1, wherein the unsynchronized portions of the file tree are objects or blocks.

4. The method as in claim 1, further comprising:
    copying portions of the file tree associated with a particular generation identifier from the first storage cluster;
    identifying a set of changed portions of the file tree on the second storage cluster between the particular generation identifier and a current generation identifier used by the second storage cluster; and
    restoring the copied portions of the file tree on the first storage cluster by transmitting, via the network, the identified set of changed portions of the file tree between the particular generation identifier and the current generation identifier from the second storage cluster to the first storage cluster.

5. The method as in claim 1, further comprising:
    performing a failback from the second storage cluster to the first storage cluster by using the generation identifiers to identify a set of the portions of the file tree written to the second storage cluster after a failover from the first storage cluster to the second storage cluster.

6. The method as in claim 1, further comprising:
    performing a local backup on the first storage cluster of a set of the portions of the file tree written to the first storage cluster and flagged with a particular generation identifier;
    making changes to the locally backed up set on the first storage cluster in part by flagging the changes with a new generation identifier; and
    propagating the changes to the locally backed up set to the second storage cluster, based in part on a comparison between the particular generation identifier and the new generation identifier.

7. The method as in claim 1, wherein the file system is a log structured file system (LSFS).

8. An apparatus, comprising:
    one or more network interfaces to communicate with a network;
    a processor coupled to the network interfaces and configured to execute one or more processes; and
    a memory configured to store a process executable by the processor, the process when executed configured to:
        perform a plurality of iterations of write operations on portions of a file tree of a file system to a first storage cluster, each write operation flagging the written portion of the file tree with a generation identifier indicative of an associated iteration of the write operations;
        identify a set of the written portions of the file tree as unsynchronized between the first storage cluster and a second storage cluster by performing a search for changes made to the written portions of the file tree between a generation identifier associated with the first storage cluster and a generation identifier associated with the second storage cluster; and
        synchronize the first and second storage clusters by sending, via a network, the unsynchronized portions of the file tree from the first storage cluster to the second storage cluster.

9. The apparatus as in claim 8, wherein the apparatus identifies the set of unsynchronized portions of the file tree between the first storage cluster and the second storage cluster by:
    searching for changes made to the written portions of the file tree for a particular inode.

10. The apparatus as in claim 8, wherein the unsynchronized portions of the file tree are objects or blocks.

11. The apparatus as in claim 8, wherein the process when executed is further configured to:
    copying portions of the file tree associated with a particular generation identifier from the first storage cluster;
    identify a set of changed portions of the file tree on the second storage cluster between the particular generation identifier and a current generation identifier used by the second storage cluster; and
    restore the copied portions of the file tree on the first storage cluster by transmitting, via the network, the identified set of changed portions of the file tree between the particular generation identifier and the current generation identifier from the second storage cluster to the first storage cluster.

12. The apparatus as in claim 8, wherein the process when executed is further configured to:
    perform a failback from the second storage cluster to the first storage cluster by using the generation identifiers to identify a set of the portions of the file tree written to the second storage cluster after a failover from the first storage cluster to the second storage cluster.

13. The apparatus as in claim 8, wherein the process when executed is further configured to:
    perform a local backup on the first storage cluster of a set of the portions of the file tree written to the first storage cluster and flagged with a particular generation identifier;
    make changes to the locally backed up set on the first storage cluster in part by flagging the changes with a new generation identifier; and
    propagate the changes to the locally backed up set to the second storage cluster, based in part on a comparison between the particular generation identifier and the new generation identifier.

14. The apparatus as in claim 8, wherein the file system is a log structured file system (LSFS).

15. The apparatus as in claim 8, wherein the network comprises a storage area network (SAN), local area network (LAN), or PCI-Express (PCIe) network.

16. A tangible, non-transitory, compsuter-readable medium storing program instructions that cause a device to execute a process comprising:
   performing a plurality of iterations of write operations on portions of a file tree of a file system to a first storage cluster, each write operation flagging the written portion of the file tree with a generation identifier indicative of an associated iteration of the write operations;
   identifying a set of the written portions of the file tree as unsynchronized between the first storage cluster and a second storage cluster by performing a search for changes made to the written portions of the file tree between a generation identifier associated with the first storage cluster and a generation identifier associated with the second storage cluster; and
   synchronizing the first and second storage clusters by sending, via a network, the unsynchronized portions of the file tree from the first storage cluster to the second storage cluster.

17. The computer-readable medium as in claim 16, wherein identifying the set of unsynchronized portions of the file tree between the first storage cluster and the second storage cluster comprises:
   searching for changes made to the written portions of the file tree for a particular inode.

18. The computer readable medium as in claim 16, wherein the process further comprises:
   copying portions of the file tree associated with a particular generation identifier from the first storage cluster;
   identifying a set of changed portions of the file tree on the second storage cluster between the particular generation identifier and a current generation identifier used by the second storage cluster; and
   restoring the copied portions of the file tree on the first storage cluster by transmitting, via the network, the identified set of changed portions of the file tree between the particular generation identifier and the current generation identifier from the second storage cluster to the first storage cluster.

19. The computer readable medium as in claim 16, wherein the process further comprises:
   performing a failback from the second storage cluster to the first storage cluster by using the generation identifiers to identify a set of the portions of the file tree written to the second storage cluster after a failover from the first storage cluster to the second storage cluster.

20. The computer readable medium as in claim 16, wherein the process further comprises:
   performing a local backup on the first storage cluster of a set of the portions of the file tree written to the first storage cluster and flagged with a particular generation identifier;
   making changes to the locally backed up set on the first storage cluster in part by flagging the changes with a new generation identifier; and
   propagating the changes to the locally backed up set to the second storage cluster, based in part on a comparison between the particular generation identifier and the new generation identifier.

\* \* \* \* \*

UNITED STATES PATENT AND TRADEMARK OFFICE
CERTIFICATE OF CORRECTION

PATENT NO. : 11,347,694 B2
APPLICATION NO. : 16/522976
DATED : May 31, 2022
INVENTOR(S) : Shravan Gaonkar et al.

Page 1 of 1

It is certified that error appears in the above-identified patent and that said Letters Patent is hereby corrected as shown below:

In the Specification

Column 4, Line 40, please amend as shown:
System (LSFS)

Signed and Sealed this
Thirtieth Day of August, 2022

Katherine Kelly Vidal
*Director of the United States Patent and Trademark Office*